United States Patent
Navratil et al.

(10) Patent No.: US 8,761,909 B2
(45) Date of Patent: Jun. 24, 2014

(54) BATCH PROCESS MONITORING USING LOCAL MULTIVARIATE TRAJECTORIES

(75) Inventors: Roman Navratil, Prague (CZ); Wendy Foslien Graber, Woodbury, MN (US)

(73) Assignee: Honeywell International Inc., Morristown, NJ (US)

( * ) Notice: Subject to any disclaimer, the term of this patent is extended or adjusted under 35 U.S.C. 154(b) by 1397 days.

(21) Appl. No.: 11/948,785

(22) Filed: Nov. 30, 2007

(65) Prior Publication Data

US 2009/0143873 A1    Jun. 4, 2009

(51) Int. Cl.
| | |
|---|---|
| *G05B 13/02* | (2006.01) |
| *G06F 17/00* | (2006.01) |
| *G06F 19/00* | (2011.01) |
| *G06F 7/48* | (2006.01) |

(52) U.S. Cl.
USPC ............... 700/31; 700/90; 700/110; 703/12

(58) Field of Classification Search
CPC .............. G05B 13/048; G05B 2219/32194; G05B 23/0254; G05B 23/024; G05B 2219/31265; G05B 2219/32201; G05B 23/0221; G05B 13/04; G05B 2219/32077
USPC ............ 700/31, 44, 30, 90, 110; 703/12
See application file for complete search history.

(56) References Cited

U.S. PATENT DOCUMENTS

| | | | | |
|---|---|---|---|---|
| 6,584,434 B1 * | 6/2003 | Schick et al. | ............. | 702/190 |
| 6,636,842 B1 * | 10/2003 | Zambrano et al. | ............. | 706/23 |
| 7,249,356 B1 * | 7/2007 | Wilson et al. | ............. | 718/101 |
| 7,606,681 B2 * | 10/2009 | Esmaili et al. | ............. | 702/187 |
| 2003/0028263 A1 * | 2/2003 | Gough et al. | ............. | 700/29 |
| 2004/0172153 A1 * | 9/2004 | Zhang et al. | ............. | 700/146 |
| 2004/0199362 A1 * | 10/2004 | Cao et al. | ............. | 702/185 |
| 2004/0243379 A1 * | 12/2004 | Paulraj | ............. | 703/22 |
| 2005/0167514 A1 * | 8/2005 | Kaushal et al. | ............. | 236/1 C |
| 2006/0218107 A1 * | 9/2006 | Young | ............. | 706/13 |
| 2008/0103748 A1 * | 5/2008 | Axelrud et al. | ............. | 703/12 |
| 2008/0109100 A1 * | 5/2008 | Macharia et al. | ............. | 700/110 |
| 2008/0133044 A1 * | 6/2008 | Grieb et al. | ............. | 700/110 |
| 2009/0105855 A1 * | 4/2009 | Mehta et al. | ............. | 700/89 |
| 2009/0149981 A1 * | 6/2009 | Evans et al. | ............. | 700/110 |
| 2009/0312851 A1 * | 12/2009 | Mishra | ............. | 700/30 |
| 2010/0057222 A1 * | 3/2010 | Turner et al. | ............. | 700/31 |

OTHER PUBLICATIONS

Gao et al., Stage Based Online Quality Control for Batch Processes, Ind., Chem. Res., 2006, 45.*
Frannson et al., Real-Time alignment of batch process data using COW for on-line process monitorung, Chemometrics and Intelligent Laboratory Systems 84 (2006).*
Camacho et al., Multi-phase principal component analysis for batch processes modeling, 2006.*

(Continued)

*Primary Examiner* — Kavita Padmanabhan
*Assistant Examiner* — Darrin Dunn
(74) *Attorney, Agent, or Firm* — Schwegman, Lundberg & Woessner, P.A.

(57) ABSTRACT

A system and method include determining a state of a batch process. Historical segments are retrieved from a historical database of trajectories of the batch process as a function of the state of the batch process. A model is created as a function of the retrieved historical segments. The model is used to provide state information about the batch process and may then be discarded.

18 Claims, 7 Drawing Sheets

(56) References Cited

OTHER PUBLICATIONS

Kassidas et al., Synchronization of Batch Trjaectories Using Dynamic Time Warping, 1998.*

Kassidas, A., et al., "Synchronization of Batch Trajectories Using Dynamic Time Warping", *AICheE Journal*, 44(4), (Apr. 1998), 864-875.

* cited by examiner

BATCH PROCESS MONITORING USING LOCAL MULTIVARIATE TRAJECTORIES

BACKGROUND

Batch processes play an important role in high value added products, such as specialty polymers, pharmaceuticals or biotech materials. A batch process is a process which is inherently batch in nature. For example, the production of a specific pharmaceutical that starts in an initial state, moves through multiple states, and ends with the desired end product. The process may then be repeated with a new batch of starting materials. A batch process can also denote repeated operations procedures, such as delayed coking in oil refining technology, or repeated dynamic transitions like regular transitions from production grade A to production grade B.

Modeling and diagnostics of such manufacturing processes, variables of which follow trajectories (batches, operating procedures, transitions between process states/grades) are difficult to model due to their non-steady state nature. A method for aligning these trajectories for the whole duration is desired. Typically, the trajectories need to have equal length and the measurements should be aligned along the trajectory based on a unifying factor. This factor is sometimes called an indicator variable. A Euclidian distance between trajectories may alternatively be used.

Existing approaches along these lines result in constraints put on unifying factor values. Such approaches may also process or model a whole synchronized trajectory together as one object. Both of these approaches may result in limitations, such as requiring significant amounts of manual data pre-processing.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and elective changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
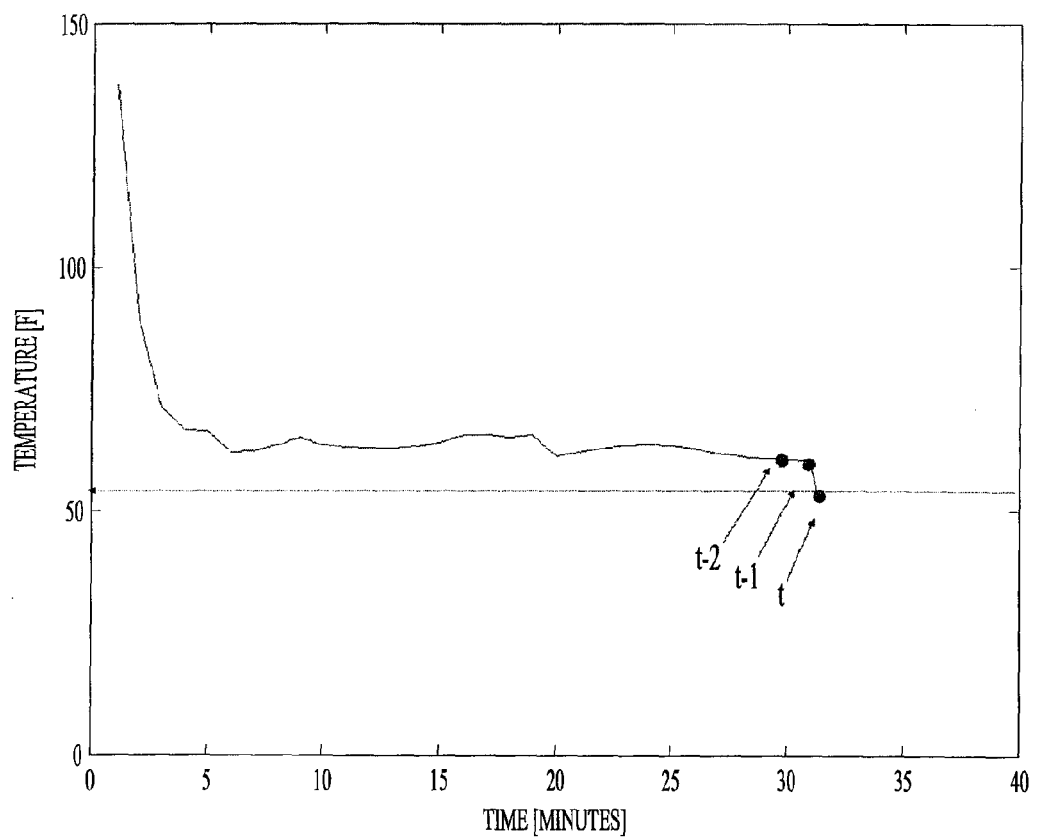
FIG. 1 is a graph illustrating a segment of an example temperature trajectory of a batch process over time according to an example embodiment.

A method for batch processes statistical modeling or monitoring for diagnosing the state of the batch process. Unlike a steady state process, a batch process by its nature transitions from one state to another. This may occur at different times each time the process is run. For example, FIG. 1 is a graph illustrating an example temperature trajectory 110 of a batch process over time. Temperature is indicated on the vertical axis with time on the horizontal axis. Three temperatures are measured as illustrated at different times, t−2, t−1 and t as indicated at 115, 120 and 125 respectively. Together, these three temperatures form a segment 130 of the overall trajectory of the temperature of the batch process. In further embodiments, a sector may be represented by 4, 5 or more measurements at times before a current temperature or other parameter is measured. The temperature may correspond to the temperature of a liquid in a container, or other temperature as desired.

Figure 2:
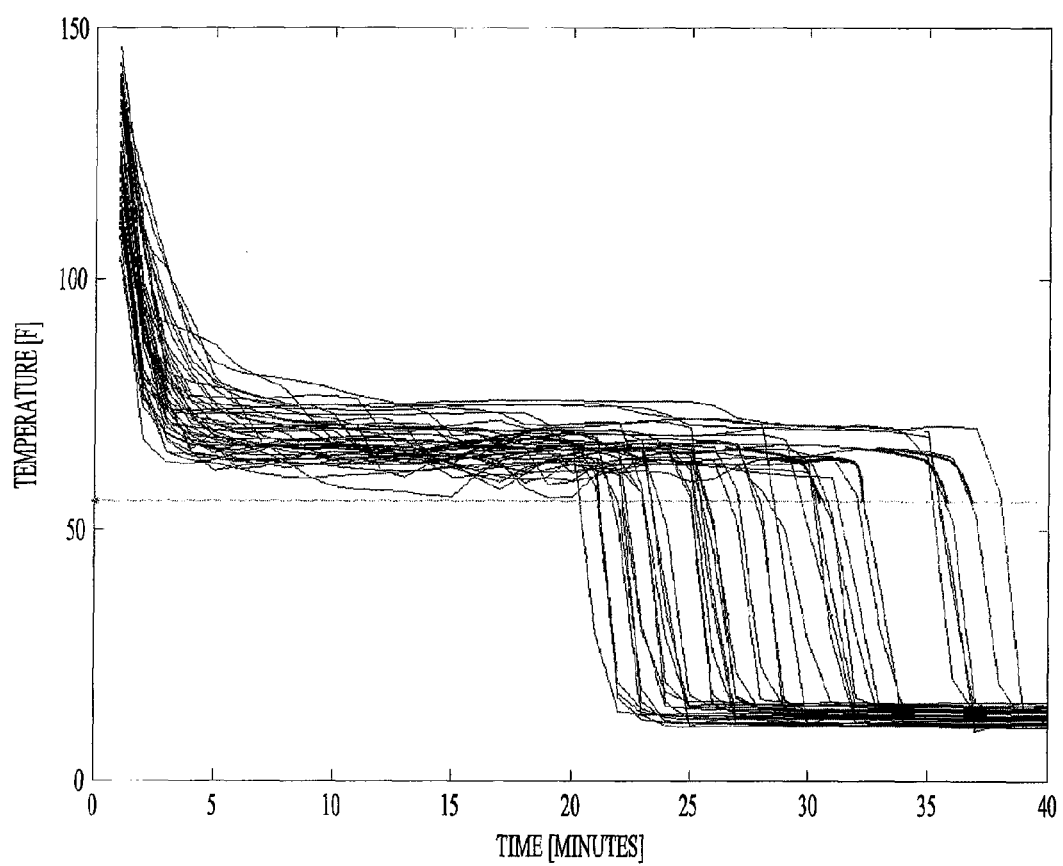
FIG. 2 is a graph illustrating historical temperature trajectories from multiple runs of the batch, with similar segments identified according to an example embodiment.

The trajectory is not handled as one object (together) in one embodiment, but rather as different segments or set of segments. Once a segment in a current process has been identified, it is desired to obtain a model of the temperature from historical data about the trajectory. An absolute timestamp from the beginning of the batch may not be helpful, because different batches may progress at different rates. Historical temperature trajectories 200 from multiple runs of the batch are illustrated in FIG. 2. As seen, the temperature trajectories start at a same high temperature and decrease at different rates, and at different times.

Based at least on the segment identified in FIG. 1, historical trajectory segments are retrieved from the historical trajectory data. Examples of four historical segments 210, 215, 220 and 225 are illustrated as darkened portions of their corresponding trajectories. Note that these segments occurred at different batch times, but are similar to the current segment 130 both in values and rate of change (i.e. slope of the trajectory). The temperature segment 130 in this example illustrates a distinct transition from a fairly steady temperature to a steeply falling temperature. This may signal an important or sensitive stage of the batch process.

In one embodiment, one or more trajectory points ahead of the current segment time t, such as t+1, t+2, etc., indicated at 230 and 235 for each segment, may be retrieved from the identified similar historical segments to aid in prediction and optimization. These future trajectory points may also help predict variance or future faults that may be likely to occur, enabling operators to take appropriate actions to avoid such faults. Time may be saved if it is known that a batch may fail. Rather than waiting for the batch to complete, the batch may be discontinued and restarted to save time that would be spent on a failing batch.

Figure 3:
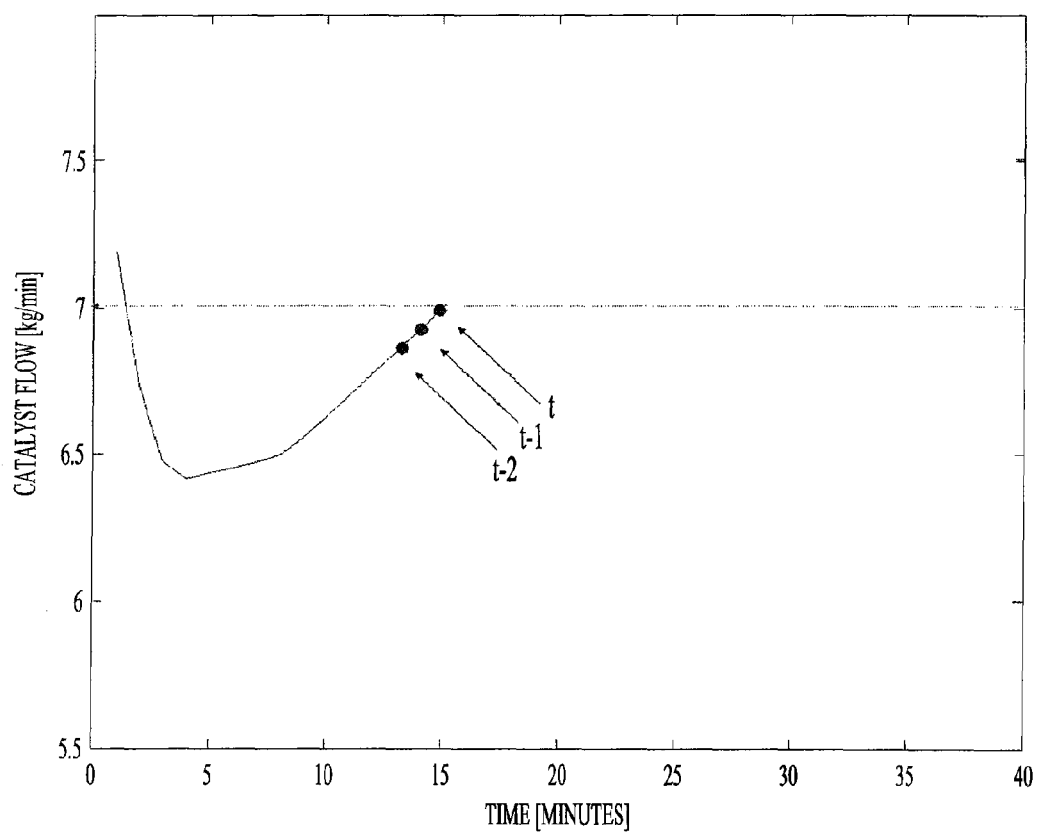
FIG. 3 is a graph illustrating a segment of an examples catalyst flow rate trajectory for a hypothetical polymerization batch reactor according to an example embodiment.
Figure 4:
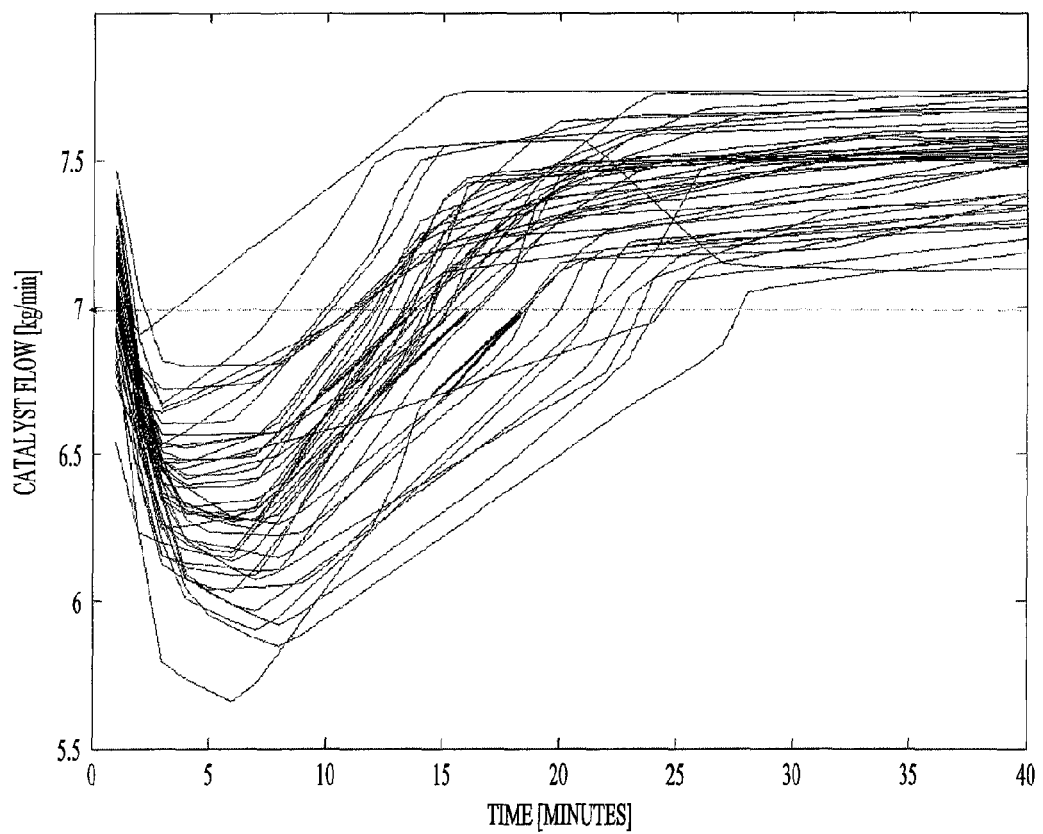
FIG. 4 is a graph illustrating historical catalyst flow rate trajectories from multiple runs of a batch, with similar segments identified according to an example embodiment.

FIG. 3 illustrates a catalyst flow rate trajectory 310 for a hypothetical polymerization batch reactor. Time is represented by the horizontal axis, with flow represented by the vertical axis. In this example, the last three flow rates in time are indicated for time t, t−1 and t−2 indicated at 315, 320 and 325 respectively. These points define a segment 330 of the trajectory representing flow rates and rate of flow change over the period of the segment. Again, similar segments are retrieved from historical trajectories of the batch process as indicated at 410, 415, 420 and 425 in FIG. 4. In one embodiment, the historical segments are retrieved as a function of the rate and rate of change, as well as other similar situations, such as measured values of other process parameters. Such process parameters may include temperature, pressure, conversion, product concentration, by-product concentration, batch process phase, product grade and other parameters that are likely to affect the future values of the measured segment. It is also possible to use multiple such parameters in their combinations.

Figure 5:
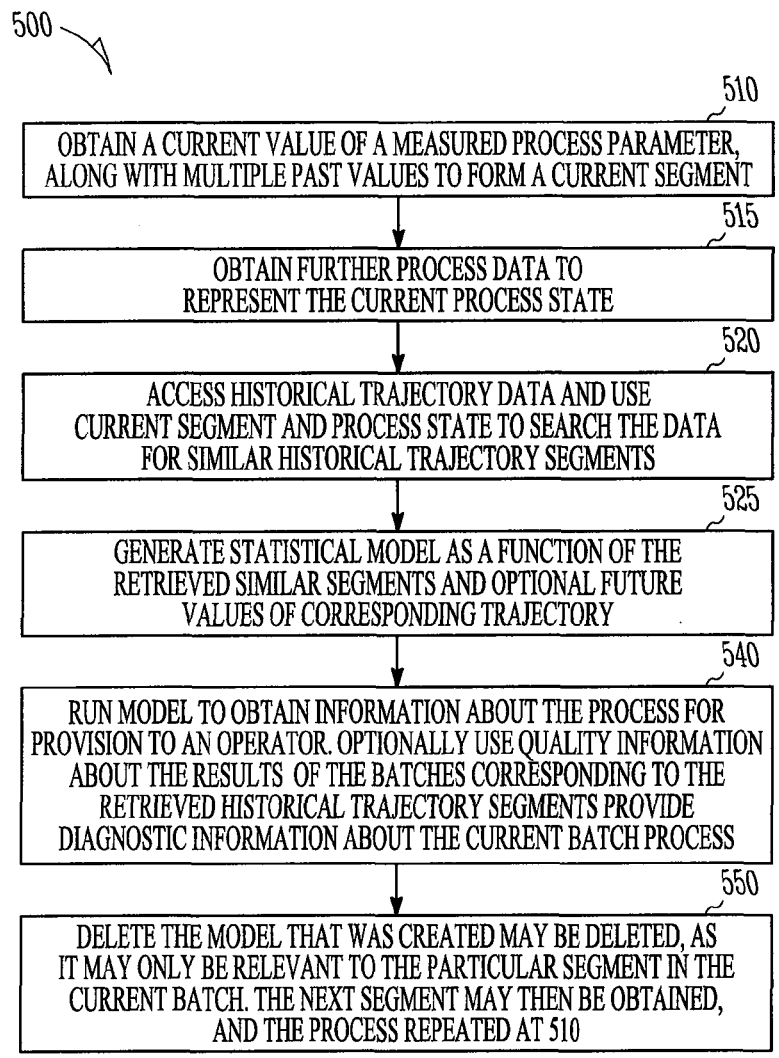
FIG. 5 is a flowchart illustrating a process of creating an ad hoc model for a batch process as a function of retrieved similar segments according to an example embodiment.

FIG. 5 is a flowchart illustrating a process 500 of creating an ad hoc model for a batch process as a function of retrieved similar segments. Results of the model may be calculated, and the model discarded. At 510, a current value of a first measured process parameter is obtained. In some embodiments, multiple past values of the first process parameter may be obtained. Three total values may be used in one embodiment, and additional values may be used in further embodiments. If multiple values of the first process parameter are used, the time between measurements may vary significantly, but should be short enough to capture desired rates of change of the parameter being measured. The time between measurements may also be highly dependent on the type of batch process being run. Further considerations may include the processing and data storage resources available to monitor the batch process.

Further process data may be obtained at 515 to adequately represent the current process state. As indicated above, the process state may include parameters such as temperature, pressure, conversion, product concentration, by-product concentration, batch process phase, product grade and other parameters that are likely to affect the future values of the measured segment. One or more such further parameters may be used together with the one or more values of the first process parameter to represent the current process state in various embodiments.

At 520, historical trajectory data is accessed and the current process state is used to search the data for similar historical trajectory segments, which may include one or more sets of values from one or more times. The search is multivariate in one embodiment, and results in historical trajectory segments that are identical or similar to the current process state.

Once the similar trajectory segments are retrieved from the historical database, an on the fly, or ad hoc statistical model may be generated at 535 as a function of the retrieved similar segments. In one embodiment, the retrieved similar segments may be used as a training set for the model. Many different types of models may be used in various embodiments, including models that are usually used for steady state or continuous processes, significantly extending the domain of such process modeling tools. At 540, the model may be run to obtain diagnostic information about the process. Quality information about the results of the batches corresponding to the retrieved historical trajectory segments may also be used to provide diagnostic information about the current batch process. The diagnostic information from the model may help predict process variables or performance indicators one or mores time steps ahead. It may be used to optimize variable settings which are applied to operate the batch process. Still further, the diagnostic information may be used to detect faults using Principal Components Analysis (PCA). For PCA, the output can be the statistical characteristics of the set of trajectories segments. Typically Q (sum if PCA residuals squares) and T^2 (Hotelling's indicator). The results of the model may be displayed on an operator screen.

In one embodiment, where the retrieved historical trajectories are based on a single measurement of one or more parameters, referred to as a single time stamp, standard PCA may be used for analysis of variance/covariance in a given state of the batch. Fault detection may be performed by evaluation of the current state. In one embodiment, regression is not available for such single timestamp trajectories.

In a further embodiment, a segment includes up to three timestamps of one or more parameters. Dynamic PCA may be used for analysis of variance/covariance, including dynamics. Fault detection may also be performed by evaluation of the current state. Regression may also be done. In a still further embodiment, historical trajectories having segments longer than three timestamps may be obtained. Multi-way PCA, including trajectories of multiple time stamps may be used. Segments may be considered as synchronized due to a relatively short length and similarity with a current batch state. Fault detection may be done by evaluation of the current state. Such longer trajectories or segments may be used for regression and consequent optimization in a current batch.

At 550, the model that was created may be deleted, as it may only be relevant to the particular segment in the current batch. The next segment may then be obtained, and the process repeated. In further embodiments, selected models may be retained and reused if a segment is likely to occur frequently. Such a model may be simply modified for some segments that are close, but not identical to the segment giving rise to the creation of the model.

In one embodiment, a set of historical batch trajectories is collected, either from data saved from already run batches, or as current batches are run. Trajectories in one embodiment may be understood as 3 a dimensional matrix, where a 1st dimension is batch ID, 2nd time and $3^{rd}$ set to individual variables. Batch information as described above may also be associated with the historical trajectories as well as resulting quality information.

Creation of the model may be performed in accordance with concepts belonging to "on-demand learning", "local modeling", "local PCA" or "just in time" way of statistical modeling. In this case, models are created on-demand, based on actual measurements or actual values. Once the model result is calculated, the model itself is deleted and when new actual measurements are available, model is built again.

Historical trajectories may be used as a statistical model training set, actual situation is evaluated using this model. Matrices representing these trajectory segment sets may include batch identifiers, and values for one or more parameters at one or more timestamps for each batch. In one embodiment, retrieved historical segments of all variables are of the same length to fit into desired matrix dimensions (size).

Various statistical models can be created on the set of historical trajectories segments. These include PCA, Dynamic PCA (also referred to as DPCA) and also Multi-way PCA (also referred to as MPCA). PCA related techniques may be used to detect abnormal situations or faults.

Regression models can be used as well. These models may be used to predict future behavior of the batch, or future values of performance indicators. It can be also used to predict if the batch will result in on-specifications product, or off-specifications product.

Regression models may also be used to predict situations under different process settings. Once such predictions are available, it is possible to optimize such settings with respect to costs, product quality or different criteria.

Figure 6:
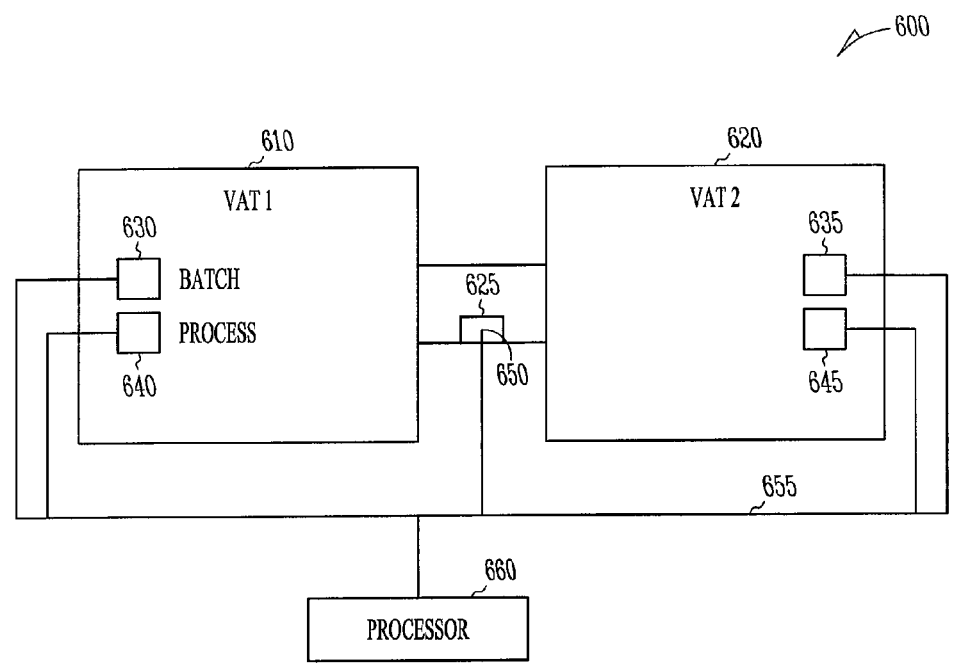
FIG. 6 is a block diagram of a system that includes some components that may be involved in one example batch process according to an example embodiment.

A block diagram of a system 600 that includes some components that may be involved in one example batch process is illustrated in FIG. 6. This example system includes a first vat or container 610, a second vat or container 620 coupled by a pipe 625. Various sensors, such as temperature sensors 630 and 635 and pressure sensors 640 and 645 are coupled to sense pressure and temperature in each of the vats. A flow meter 650 is coupled to sense flow through pipe 625 between the vats. It should be understood that this is a simplified representation of one batch process, and that many more and different types of sensors and components may be used in further systems. In one embodiment, the sensors are coupled to a network 655, which may be hardwired or wireless in various embodiments, and to a processor or computer system 660 for performing the methods described above.

Figure 7:
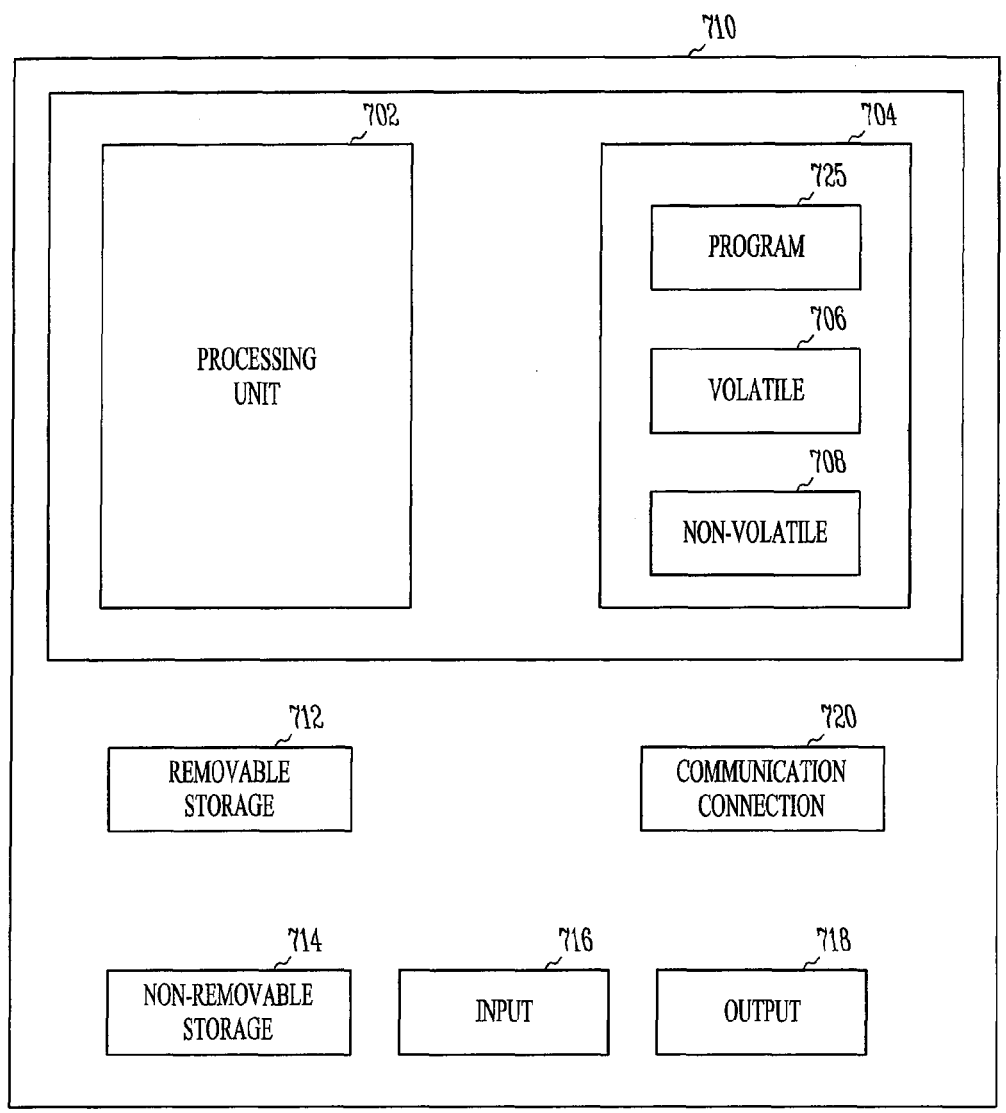
FIG. 7 is a block diagram of a computer system that executes programming for performing method according to an example embodiment.

A block diagram of a computer system that executes programming for performing the above algorithm is shown in FIG. 7. A general computing device in the form of a computer 710, may include a processing unit 702, memory 704, removable storage 712, and non-removable storage 714. Memory 704 may include volatile memory 706 and non-volatile memory 708. Computer 710 may include—or have access to a computing environment that includes—a variety of computer-readable media, such as volatile memory 706 and non-volatile memory 708, removable storage 712 and non-removable storage 714. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 710 may include or have access to a computing environment that includes input 716, output 718, and a communication connection 720. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 702 of the computer 710. A hard drive, CD-ROM, and RAM are some examples of articles including a computer-readable medium.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A computer implemented method comprising:
the computer determining a state of a batch process;
the computer retrieving historical segments from a storage device containing a historical database of trajectories of the batch process as a function of the state of the batch process;
the computer creating a model as a function of the retrieved historical segments; and
the computer using the model to provide state information about the batch process wherein determining the state of a batch process comprises obtaining multiple measurements of one parameter, and wherein the retrieved historical segments for the parameter are retrieved that are similar to the multiple measurements of the parameter are included in creating the model while historical segments that are not similar to the multiple measurements of the parameter are excluded in creating the model, and wherein the model is deleted after use, and
wherein a new segment within the same state of the batch process is obtained after use of the model to generate a new model.

2. The method of claim 1 wherein the provided information comprises diagnostic information for provision to an operator based on batch results corresponding to the historical segments retrieved.

3. The method of claim 1 wherein the provided information comprises information about the state of the batch process suitable for modifying control of the batch process.

4. The method of claim 1 wherein determining whether historical segments are similar to the multiple measurements of the parameter includes comparing values and rate of change of the parameter.

5. The method of claim 1 wherein determining the state of a batch process further comprises obtaining information about a further parameter selected from the group consisting of temperature, pressure, conversion, product concentration, by-product concentration, batch process phase, and product grade.

6. The method of claim 1 and further comprising retrieving future trajectory points of the retrieved historical segments for use in creating the model, and determining from such future trajectory points whether the batch is likely to fail.

7. The method of claim 1 wherein the retrieved historical segments are used as a training set for creating the model.

8. The method of claim 1 and further comprising retrieving quality information about results of the batch corresponding to the retrieved historical segments, and providing diagnostic information about a current batch process.

9. A non-transitory computer readable storage device having instructions for causing a computer to perform a method, the method comprising:
determining a state of a batch process;
retrieving historical segments from a historical database of multivariate trajectories of the batch process as a function of the state of the batch process;
creating a model as a function of the retrieved historical segments; and
using the model to provide state information about the batch process wherein determining the state of a batch process comprises obtaining multiple measurements of at least one parameter, and wherein the retrieved historical segments are retrieved that are similar to the multiple measurements of the at least one parameter are included in creating the model while historical segments that are not similar to the multiple measurements of the parameter are excluded in creating the model, and wherein the model is deleted after use, and wherein a new segment within the same state of the batch process is obtained after use of the model to generate a new model.

10. The method of claim 9 wherein the provided information comprises diagnostic information for provision to an operator.

11. The non-transitory computer readable storage device of claim 9 wherein the provided information comprises information about the state of the batch process suitable for modifying control of the batch process.

12. The non-transitory computer readable storage device of claim 9 wherein determining the state of a batch process comprises obtaining multiple measurements of at least one parameter, and wherein the retrieved historical segments are retrieved as a function of the multiple measurements of the at least one parameter.

13. The non-transitory computer readable storage device of claim 12 wherein determining the state of a batch process further comprises obtaining information about a further parameter selected from the group consisting of temperature, pressure, conversion, product concentration, by-product concentration, batch process phase, and product grade.

14. The non-transitory computer readable storage device of claim 9 wherein the method further comprises retrieving future trajectory points of the retrieved historical segments for use in creating the model, and determining from such future trajectory points whether the batch is likely to fail.

15. The non-transitory computer readable storage device of claim 9 wherein the retrieved historical segments are used as a training set for creating the model.

16. The non-transitory computer readable storage device of claim 9 wherein the method further comprises retrieving quality information about results of the batch corresponding to the retrieved historical segments, and providing diagnostic information about a current batch process.

17. A system comprising:
   a computer system for determining a state of a batch process;
   a module stored on a storage device for retrieving historical segments from a historical database of trajectories of the batch process as a function of the state of the batch process;
   a module stored on a storage device for creating a model as a function of the retrieved historical segments; and
   a module stored on a storage device for using the model to provide state information about the batch process wherein the provided information comprises diagnostic information for provision to an operator based on batch results corresponding to the historical segments retrieved and wherein the state of a batch process comprises multiple measurements of at least one parameter, and wherein the retrieved historical segments are similar to the multiple measurements of the at least one parameter are included in creating the model while historical segments that are not similar to the multiple measurements of the parameter are excluded in creating the model, and wherein the model is deleted after use, and wherein a new segment within the same state of the batch process is obtained after use of the model to generate a new model.

18. The system of claim 17 wherein the computer system determines the state of a batch process by obtaining multiple measurements of at least one parameter, and wherein the retrieved historical segments are retrieved as a function of the multiple measurements of the at least one parameter.

* * * * *